(12) United States Patent
Sundaralingam et al.

(10) Patent No.: US 7,715,470 B2
(45) Date of Patent: May 11, 2010

(54) RECEIVER AND A RECEIVING METHOD

(75) Inventors: Sathiaseelan Sundaralingam, Surrrey (GB); Mikko Saily, Sipoo (FI); Khairul Hasan, Surrey (GB); Eric Jones, Hants (GB)

(73) Assignee: Nokia Corporation, Espoo (FI)

( * ) Notice: Subject to any disclaimer, the term of this patent is extended or adjusted under 35 U.S.C. 154(b) by 940 days.

(21) Appl. No.: 11/418,269

(22) Filed: May 5, 2006

(65) Prior Publication Data

US 2007/0092042 A1 Apr. 26, 2007

(30) Foreign Application Priority Data

Oct. 24, 2005 (GB) .................................. 0521641.1

(51) Int. Cl.
*H03H 7/30* (2006.01)
(52) U.S. Cl. ........................................ 375/229; 375/231
(58) Field of Classification Search ................. 375/229, 375/231–233, 316, 350
See application file for complete search history.

(56) References Cited

U.S. PATENT DOCUMENTS

| | | | |
|---|---|---|---|
| 6,266,616 B1 * | 7/2001 | Needelman | ................. 701/222 |
| 7,428,265 B1 * | 9/2008 | Adireddy et al. | ............. 375/233 |
| 7,443,826 B1 * | 10/2008 | Atarius et al. | ................ 370/342 |
| 2002/0172307 A1 * | 11/2002 | Sandberg | ..................... 375/344 |
| 2003/0087620 A1 * | 5/2003 | Sendonais | .................... 455/266 |
| 2003/0152170 A1 * | 8/2003 | Yousef | ........................ 375/340 |
| 2005/0089115 A1 | 4/2005 | Hartmann et al. | |
| 2006/0215778 A1 * | 9/2006 | Murthy et al. | ............... 375/260 |

FOREIGN PATENT DOCUMENTS

| | | |
|---|---|---|
| DE | 41 32 738 A1 | 4/1993 |
| EP | 0 534 399 A2 | 3/1993 |

OTHER PUBLICATIONS

International Search Report, PCT/IB2006/003047 dated Feb. 20, 2007.

* cited by examiner

*Primary Examiner*—Emmanuel Bayard
(74) *Attorney, Agent, or Firm*—Squire, Sanders & Dempsey L.L.P.

(57) ABSTRACT

A receiver for receiving transmitted signals comprising reference information known to said receiver, said receiver comprising means for estimating said reference information and non reference information to provide estimated information, said non reference information being at least one of immediately preceding and immediately succeeding said reference information; and means for using the estimated information to determine an error said received signals and to compensate for said error.

22 Claims, 5 Drawing Sheets

RECEIVER AND A RECEIVING METHOD

FIELD OF THE PRESENT INVENTION

The present invention relates to a receiver and a method of receiving. In particular, but not exclusively, the present invention relates to a method of receiving a signal containing information in dependence on the frequency or a frequency related characteristic.

BACKGROUND TO THE INVENTION

Wireless communication systems are known. One known system is illustrated schematically in FIG. 1. The area covered by a wireless communication network 2 is divided into a number of cells 4. The cells may be side by side and/or overlapping. Each cell 4 is provided with a base station 6. Each base station 6 is arranged to communicate with mobile stations 8 or other user equipment located in the cells.

Figure 1:
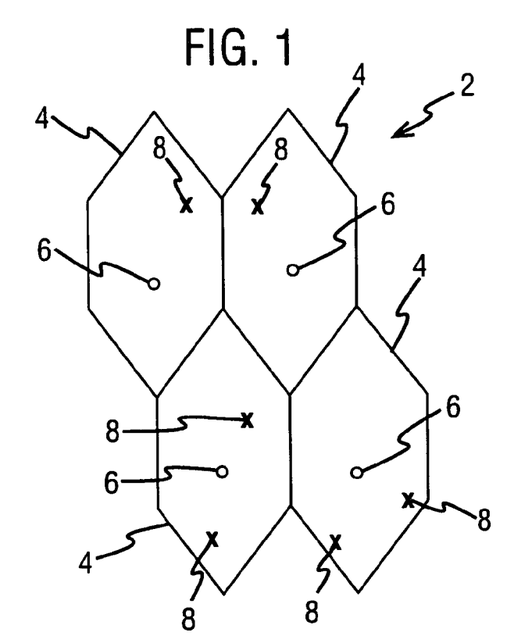
FIG. 1 shows a schematic view of a network.

A number of different standards are known which regulate the communication between the base stations and the mobile stations. One commonly used standard is the GSM (Global System for Mobile Communications) standard. This is a digital communication system. In GSM, data is transferred between the mobile stations 8 and the base stations 6 as a radio signal over a physical channel which may use frequency and/or time division multiplexing to create a sequence of radio frequency channels and time slots. Each frequency band is divided into time division multiple access frames, with 8 users per frame. Each user is allocated time to send a single burst of information. Typically, the mobile station and base station which are in communication will use different frequency bands.

GSM can, in some implementations, use GMSK (Gaussian Minimum Shift Keying) modulation. GMSK modulation uses the phase of the radio signal in order to transmit the data. The phase of the signal is of course dependent on the frequency of the signal. In order to correctly identify the transmitted data, the frequency of the signal received at the receiving one of the base station and the mobile station should be within defined limits as compared to the intended frequency of transmission of that signal. If the frequency has shifted beyond these limits, then errors in the recovery of the data may occur.

Errors in the frequency at the receiving one of the mobile station and base station can occur for a number of reasons. For example, this can occur if one of the mobile station and the base station is moving. Usually, of course, the mobile station will move. Changes in the frequency can of course occur due to the Doppler shift. This effect is particularly marked when the mobile station is moving relatively fast. For example, high speed trains having a speed of around 330 km/hour are being proposed. At those speeds, the Doppler shift introduced by the movement of the mobile station would result in a relatively large frequency change. It should of course also be noted that movement at slower speeds will also result in Doppler shifts.

Movement of the mobile station relative the base station is not the only source of frequency changes. Other errors may be introduced. For example, multi-path propagation may change the frequency of the signal received. The oscillator of the transmitter may not be working correctly, for example due to changes in temperature, and accordingly the transmitted signal and hence the received signal are not at the correct frequency. Additionally, adverse weather conditions particularly very hot or very cold weather can change the condition of the radio channel which results again in a frequency shift of the received radio signals. In general, the changes in frequency are introduced either by radio frequency impairments or change in channel characteristics. The radio frequency impairments include multi-path propagation and variation in the crystal oscillator characteristics. The change in channel characteristics include the effects due to movement and changes in weather conditions.

Generally, the GSM standard is reasonably robust. As such, it is able to cope with some variation in the frequency. However, errors from more than one source may be present which cumulatively provide a relatively large frequency error. Additionally, very fast moving mobile stations can introduce a relatively large frequency shift on their own.

Reference is made to International Patent Application WO 03/039025 in the name of the present applicant. In this document, automatic frequency correction is described. In a first stage, the frequency is estimated using a training sequence portion. The estimated frequency offset is then removed from the samples and taps. In a second stage, some symbols are pre-equalized using a decision feedback equalizer. The frequency offset is estimated using the training sequence, tails and extended symbols. The frequency offset is then removed from the samples and taps.

This arrangement has the potential problem that the overall automatic frequency correction performance relies on the first stage. However, the first stage uses only the training sequence. The frequency offset estimation using the training sequence portion alone may not be reliable when the signal to noise ratio is poor. In that scenario, the decision feedback equalizer may introduce more errors than the decisions made without the first stage and hence affect overall performance.

Furthermore, fast synthesizers, which can hop between time slots are being considered. However, this introduces severe constraints into the digital signal processor algorithms. A tail and a few symbols may be corrupted and cannot be used. Because of the proposed hopping between time slots, the settling time of these synthesizers is a function of cost and the settling time may for example be of the order of 20-30 microseconds. As a result of this settling time, a few of the symbols and the tails are rendered unusable.

SUMMARY OF THE INVENTION

According to one aspect of the invention, there is provided a receiver for receiving transmitted signals comprising reference information known to said receiver, said receiver comprising means for estimating said reference information and non reference information to provide estimated information, said non reference information being at least one of immediately preceding and immediately succeeding said reference information; and means for using the estimated information to determine an error said received signals and to compensate for said error.

According to another aspect of the invention, there is provided a receiver for receiving transmitted signals comprising reference information known to said receiver, said receiver comprising an estimator for estimating said reference information and non reference information to provide estimated information, said non reference information being at least one of immediately preceding and immediately succeeding said reference information; an error estimator for using the estimated information to determine a frequency error for said received signals; and a frequency error corrector to compensate the received signal for said error.

According to another aspect of the invention, there is provided a method of receiving transmitted signals comprising known reference information, said receiving method comprising the steps of estimating said reference information and non reference information to provide estimated information, said non reference information being at least one of immediately preceding and immediately succeeding said reference information; and using the estimated information to determine an error in said received signals and to compensate for said error.

According to another aspect of the invention, there is provided a frequency correction method comprising a first stage and a second stage, said first stage comprising first means for estimating a first number of symbols of a received signal, first means for estimating the frequency error based on the estimated symbols and first means for carrying out a frequency offset correction on a second number of symbols of the received signal to provide a modified signal, and the second stage comprises second means for estimating at least the second number of symbols of the modified signal, second means for estimating the frequency error based on the estimated symbols output by said second estimating means and second means for carrying out a frequency offset correction on the received signal using the frequency error estimated by said second estimating means.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE PRESENT INVENTION

Figure 2:
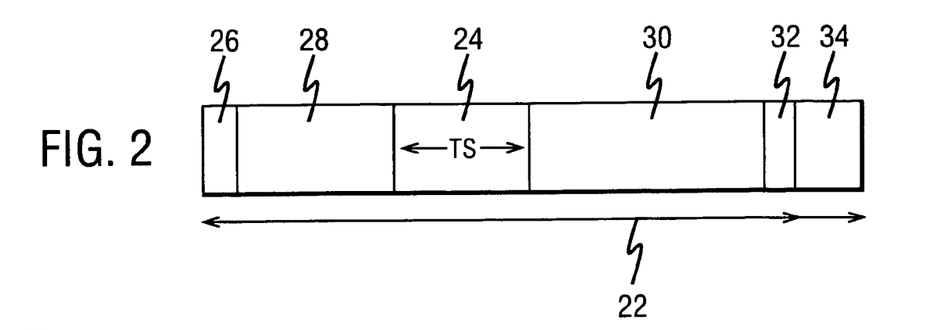
FIG. 2 shows a diagrammatic representation of a burst in the GSM standard.

Reference will now be made to FIG. 2 which shows a diagrammatic representation of a GSM bust. In the GSM standard, the GMSK or 8PSK modulated data is formed into a burst containing a sequence of 156.25 complex symbols. Each symbol has a real part and an imaginary part. 156.25 symbols is the number of symbols which can fit into a time slot. The burst 22 has six components. A first "tail bit" field 26 is provided. This first tail bit field 26 comprises three symbols. Next is a first set of encrypted data 28. This consists of 58 symbols. This is followed by a training sequence 24 which is 26 symbols alone. The training sequence is known in advance by the receiver. This is knows as a mid-amble as it comes between two data fields. The training sequence 24 is followed by a second data set 30 which again comprises 58 symbols of encrypted data. Finally, this is followed by a second "tail bit" field which comprises 3 symbols. At the end of the bust is a guard period 34, which is empty and which extends for a period equivalent to 8.25 symbols.

In the GMSK modulation scheme, the symbol is equivalent to a bit so there are 148 bits in a burst. It should be appreciated that the training sequence symbols are known to the receiver in advance.

The frequency of the burst received by the receiving one of a mobile station and the base station frequently varies from the intended frequency of transmission of the burst by a certain amount of "frequency offset". This frequency offset has the consequence of the phase of the signal change with time.

Embodiments of the present invention are arranged to compensate for any of the frequency offsets, regardless of the cause. For example, the frequency offset may be introduced by movement of the mobile station, changes in temperature, changes in component characteristics or the like.

Figure 3:
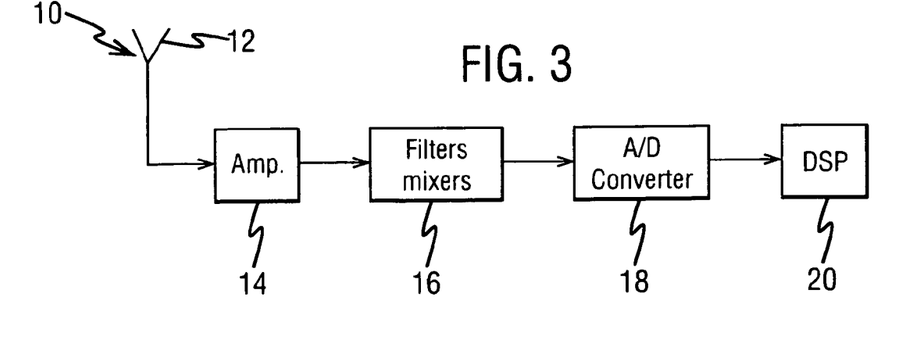
FIG. 3 shows the general structure of a receiver which can be used in embodiments of the present invention.

Reference will now be made to FIG. 3 which has schematically a receiver embodying the present invention. The receiver may be incorporated in a mobile station or may be incorporated in a base station or both.

The transmitted bursts 22 are received by an antenna 12. This signal received by the antenna 12 is input to an amplifier 14 which amplifies that signal. The amplified signal is output by the amplifier to filters and mixers 16. The filters and mixers 16 have the effect of removing signals which fall outside the frequency of interest and also reduce the signal to the base band frequency. The output of the filters and mixers 16 is input to an analog to digital converter 18. The output of the filters and mixers is an analog signal. This is converted by the analog to digital converter 18 to a digital signal. The digital signal is input to a digital signal processor. Embodiments of the present invention are preferably carried out in a digital signal processor or at least in a digital domain. However, it is conceivable that alternative embodiments of the present invention may be carried out at least partially in the analog domain.

Figure 4:
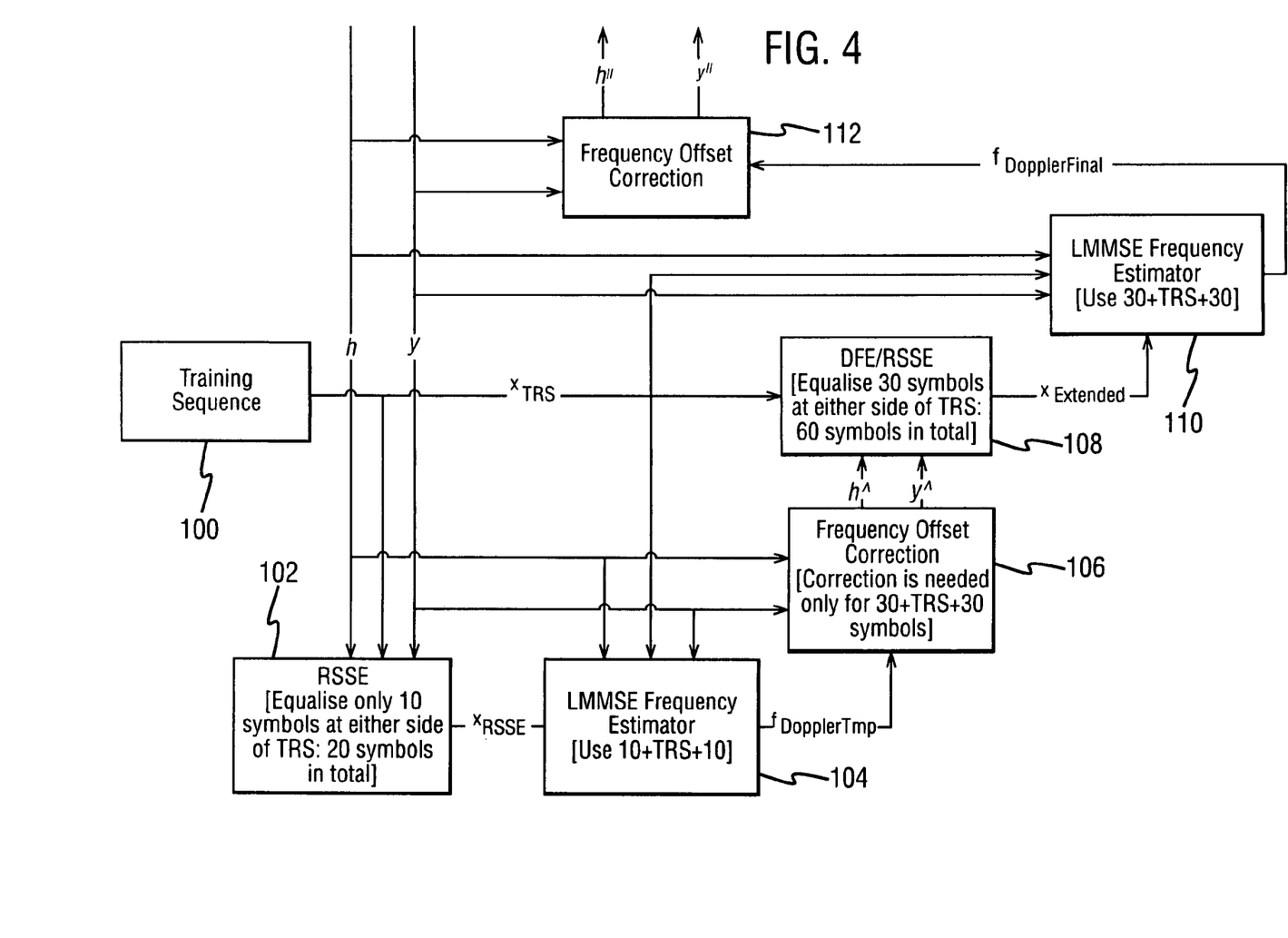
FIG. 4 shows part of the receiver of FIG. 3 in more detail.

Reference is now made to FIG. 4 which shows part of the receiver FIG. 3 in more detail.

First block RSSE (Reduced State Sequence Estimation) 102 receives the training sequence from training sequence block 100. This is a local version of the training sequence and not the version of the training sequence which has been transmitted. RSSE block 102 also receives a channel impulse response h input and received samples y. This block estimates 10 symbols on either side of the training sequence. In other words, equalization of 10 symbols of the received data, positioned on either side of the training sequence is estimated.

The 20 estimated symbols, 10 on either side of the training sequence, XRSSE and the known 26 training symbols (XTRS) are input to a LMMSE (Linear Minimum Means Square Error) frequency estimator block 104. This block 104 also receives as an input the channel impulse response h and the received samples y.

The LMMSE frequency estimator block 104 uses the 10 estimated symbols on either side of the training sequence as well as the 26 training sequence symbols to estimate the frequency offset. The output of the LMMSE frequency estimator block 104 is thus $f_{DopplerTmp}$, which is the estimate of the Doppler frequency offset, which is input to frequency offset correction block 106.

Frequency offset correction block 106 receives additionally the channel impulse response h and received samples y. The estimated frequency offset is corrected for the received samples and taps. However, this correction is only carried out for the training sequence and 30 data symbols on each side of the training sequence. The modified channel impulse response ĥ and the corrected received samples ŷ is output by the frequency correction block 106 to DFE/RSSE (Decision Feedback Equalizer/Reduced State Sequence Estimation) block 108.

This block 108 additionally receives the training sequence from block 100. Block 108 is arranged to equalize, that is estimate, 30 symbols on either side of the training sequence.

In other words, 60 symbols are estimated in total. This block uses the modified channel impulse response and corrected samples.

The estimated extended symbols are output from block 108 to a second LMMSE frequency estimator block 110. The second frequency estimator block 110 also receives the channel impulse response h and received samples y as well as the training sequence. The frequency is then estimated using the 60 pre-equalized or estimated symbols and the 26 symbols of the training sequence. The second frequency estimator then provides a second estimate of the Doppler frequency $f_{Doppler\text{-}Fina}$ which is input to a second frequency offset correction block 112.

The second frequency offset correction block also receives the original channel impulse response h and received samples y.

The second frequency offset correction provides a modified channel impulse response h" and modified samples y" to the second, final stage of frequency offset correction. Thus, the final frequency offset correction unlike the prior art, applies the final correction on samples and taps that have not been frequency offset corrected. It has been found that by applying frequency offset correction on the original samples provides better performance than applying the correction to the intermediate corrected samples.

Thus, embodiments of the present invention are able to improve the decision directed AFC performance by improving the pre-equalizer decisions. This will be applicable to both tail based and tail independent decision directed automatic frequency correction. It has been found that this can address enhanced base station performance issues which require the settling time to take into account frequency hopping. Embodiments of the present are able at least in some embodiments of the present invention to come close to matching a performance of the known algorithm which uses the tail. In some embodiments of the invention the tail symbols may additionally be used.

Edge (Enhanced Data Rate for GSM Evolution) is considering introducing a new normal burst format to improve the efficiency of mobile multi slot classes. One option being considered to increase the payload data rate is to remove some or all the predetermined data from the time slot after the initial slot, that is for example the tail bit, FACCH flags, training sequence, and/or guard period from the allocated multislots 2 ... n. To maintain the channel tracking capabilities, the frequency offset may need to be updated for the assigned slots 2 ... n. In this case, the reference data for frequency estimation needs to be generated using the same DFE/RRSE principle as for the training sequence extension set out in relation to embodiments of the invention.

Figure 5:
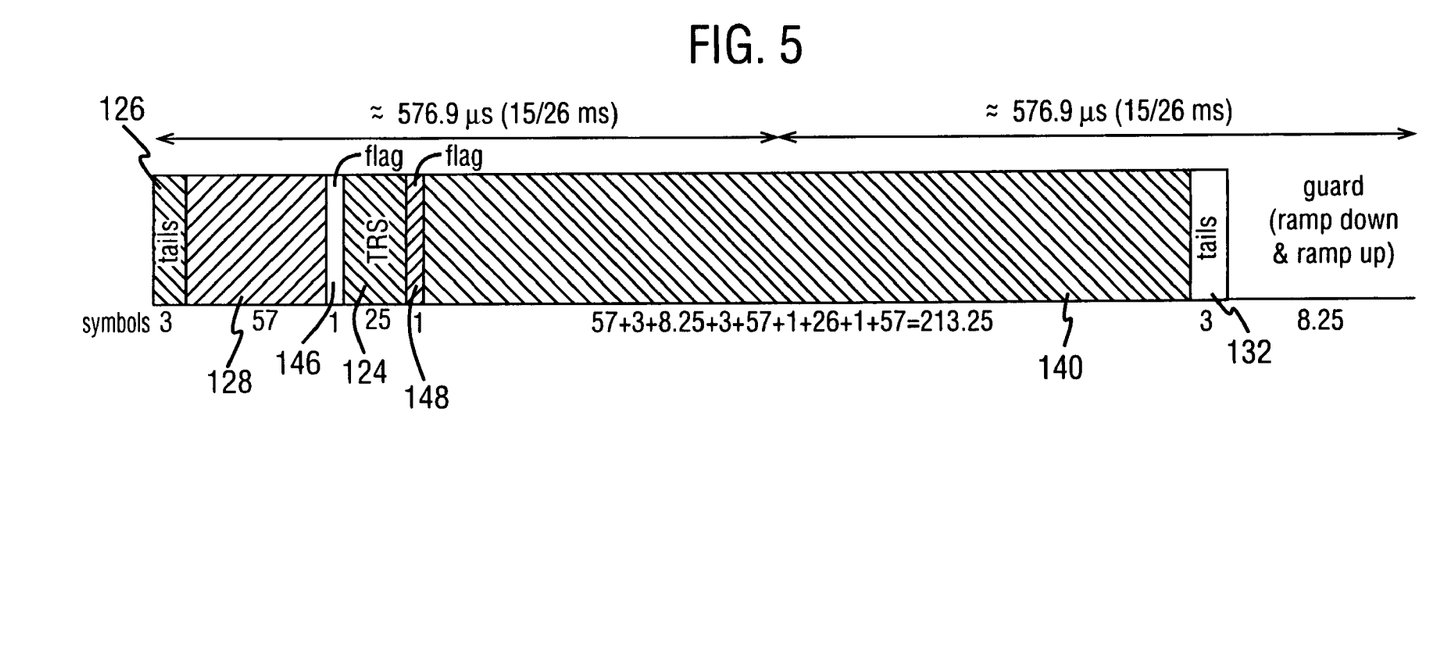
FIG. 5 shows a modified burst structure.

Reference is made to FIG. 5 which shows a proposal for an EDGE phase 2 multislot possibility. In this example, the multislot is extended to cover two slots. In the proposals, there is a first field 126 comprising tails. This is followed by a first data field 128. A flag field 146 containing one flag symbol is provided. This is followed by the training sequence field 124. A second flag field 148 is provided which follows the training sequence field. It should be appreciated the flag fields can be provided in the embodiment shown in FIG. 2. The structure of the field thus far is similar to that which is illustrated in FIG. 2. However, this is followed by a data field which extends from one slot into the next slot and contains very many more symbols. For example, the current proposal for the second data slot contains 57 symbols. The proposal illustrated in FIG. 5 has 213.25 symbols. This extended data slot is followed by a tails of slot 132. It should be appreciated that the length of the second data field can be extended to cover still further slots. Thus, the removal of the training sequence from the GSM burst format frees more room for additional user data. Thus, within a multi slot allocation, this could be done from slot 2 ... n, i.e. the training sequence which remains in the first slot and would disappear in the subsequent one. The flags can be removed from slot 2 ... n since the flags of the slot would apply. Embodiments of the present invention can be applied particularly to the slot structure shown in FIG. 5.

Embodiments of the present invention, two taps, two states reduce complexity equalizers are used for pre-equalization. With this type of equalizer, the complexity for estimating 20 hard symbols relatively insignificant.

In a preferred embodiment of the present invention, it has been suggested that in the first estimation that 10 symbols on either side of the training sequence be used. In the first frequency estimation, the 20 pre-equalized symbols and the 26 training sequence symbols are used, providing 46 symbols. In the second frequency estimator, 30 symbols on either side of the training sequence are used. It should be appreciated that the number of symbols used can be varied in alternative embodiments of the present invention. For example in the first equalization block the number of symbols on either side of the training sequence used could be preferably between 10 and 15 symbols. Preferably, the number of symbols used by the second equalizer is roughly the same as the number of training sequence symbols. The processing part of the digital signal processor may effectively define the upper limit as to the number of symbols of either side of the training sequence which are processed.

In preferred embodiments of the present invention, symbols on either side of the training sequence are equalized. However, in alternative embodiments of the present invention, symbols on only one side of the training sequence may be used. The symbols may be directly adjacent the training sequence or removed therefrom by a small number of symbols.

Figure 6:
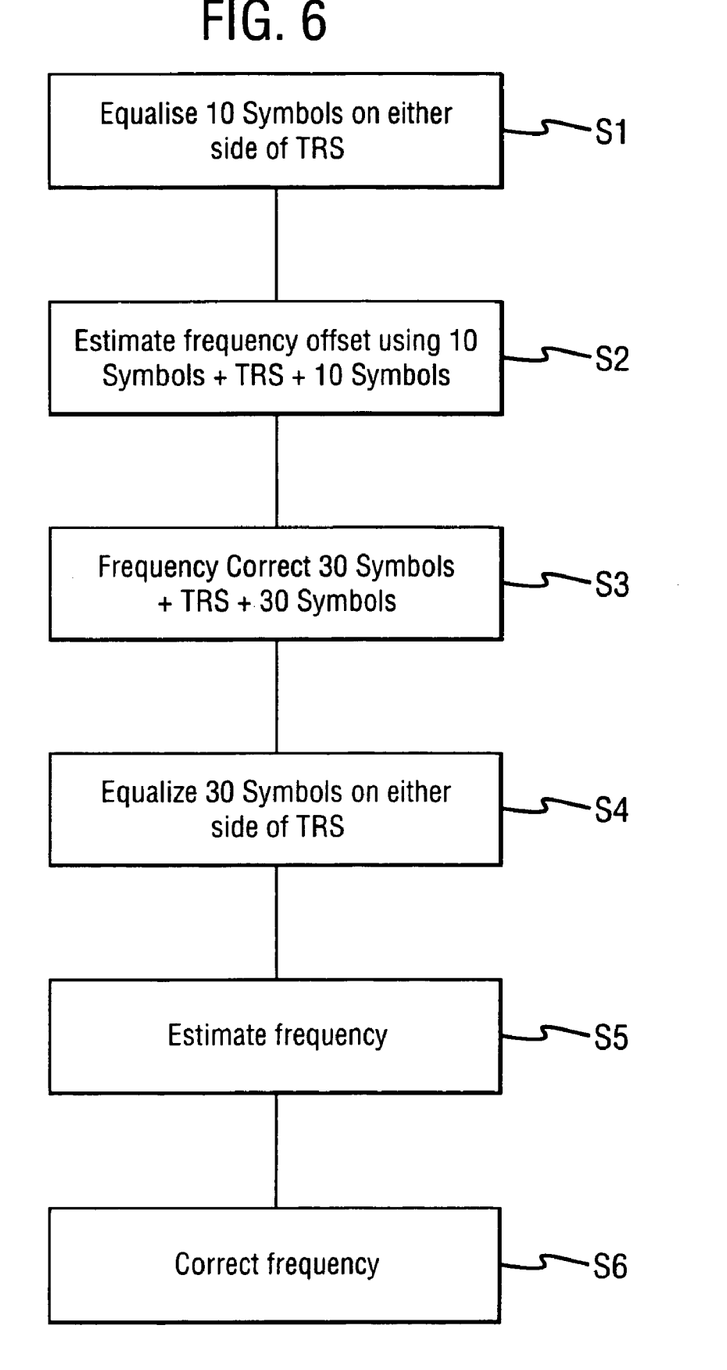
FIG. 6 shows a flow chart of the steps carried out in embodiments of the present invention.

Reference is now made to FIG. 6 which shows the steps of the method embodying the present invention.

In step S1, the 10 symbols on either side of the training sequence are equalized (estimated).

In step S2, Doppler frequency offset is estimated using the 10 symbols on either side of the training sequence and the training sequence.

In step S3, the estimated Doppler frequency offset is used to correct 30 symbols on either side of the training sequence as well as the received training sequence. The frequency corrected channel impulse response and received samples are used in step S4. In particular, the 30 symbols on either side of the training sequence are equalized (estimated). This is on the basis on the originally received symbols and initially determined channel impulse response.

The estimated 30 symbols on either side of the training sequence are used in step S5 along with the training sequence to estimate the frequency. The second estimate of the Doppler frequency is calculated on the base of the channel impulse response and samples as received, without any correction. In other words the same version of the channel impulse response and received samples is used in step S5 as step S1.

The estimated frequency is used in a step S6 to correct the initially determined channel impulse response and received samples.

Figure 7:
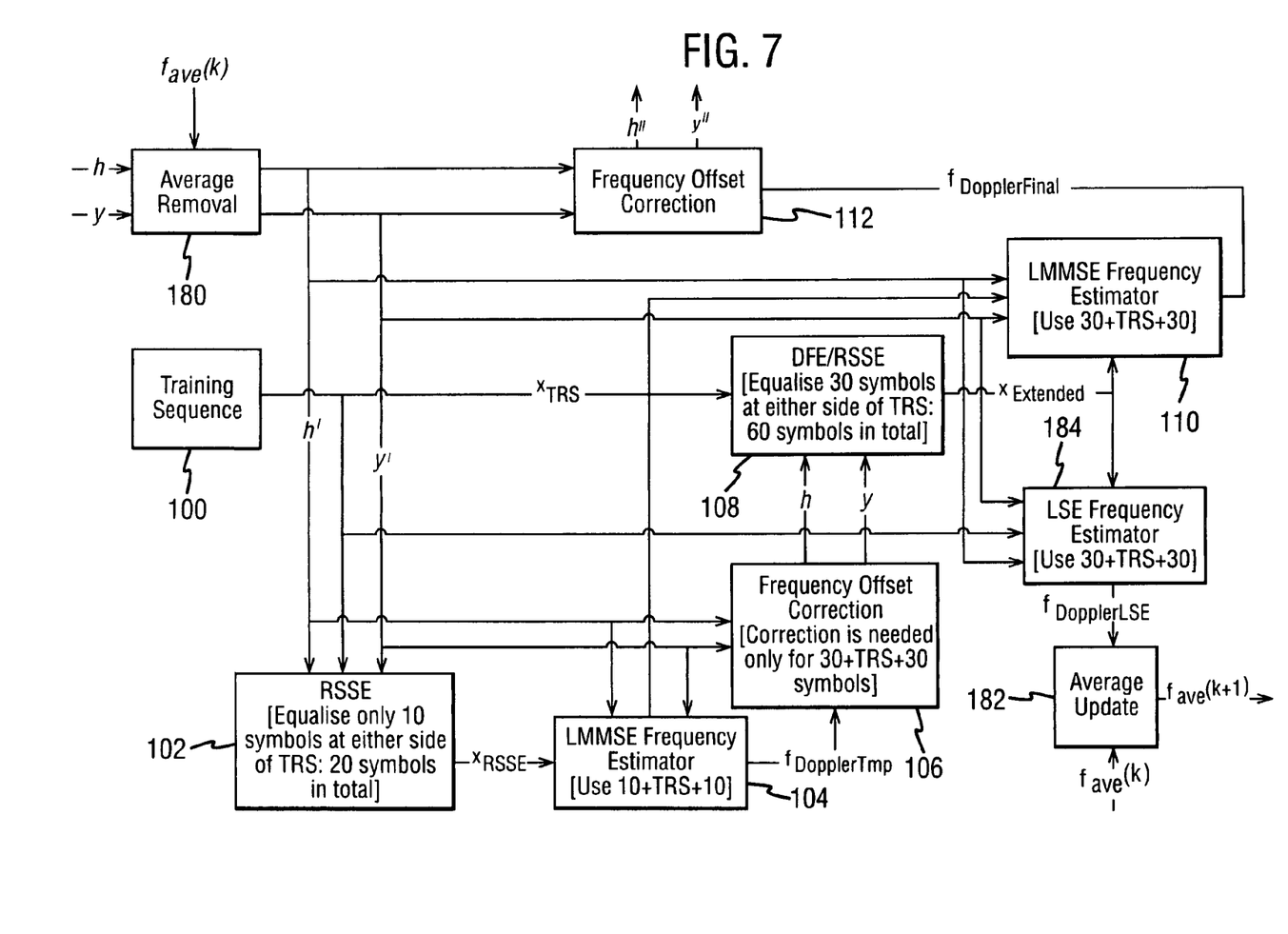
FIG. 7 shows a second embodiment of the invention.

Reference is now made to FIG. 7 which shows a second embodiment of the present invention. In this embodiment, averaging is used. Averaging is needed to achieve a high speed requirement. Due to the increased speed of trains, it has been desired to improve base transceiver station performance to keep the same quality requirement particularly for GMSK modulated signals. The base transceiver station is to meet an average required quality level-4 or better for successful set up and handover process which mobiles moving at a velocity of up to 330 km per hour.

Blocks 100, 102, 104, 106, 108, 110 and 112 operate in a similar manner to that described in relation to FIG. 4. However, instead of receiving the channel impulse response h and received samples y, blocks 102, 104, 106, 110 and 112 instead receive the modified channel impulse response h' and modified received samples y' output by average removal block 180.

An additional block LSE (Least Square Error) frequency estimator block 184 is provided. This receives the output of block 108 as well as the output of the average removal block 180. This provides an estimate of the frequency offset using the least square error frequency algorithm. Block 184 also uses the 30 symbols on either side of the training sequence as well as the training sequence itself.

The frequency offset calculated by LSE frequency estimator block 184 is provided to average update block 182. This provides an average of the frequency offset. The averaged frequency offset is then used in the average removal block 180.

Embodiments of the present invention may be incorporated in a base station and/or a mobile station or other suitable user equipment.

The preferred embodiment of the present invention has been described in the context of the GSM system using GMSK modulation. It should be appreciated that embodiments of the present invention can be used with different modulation methods which are reliant on frequency or a frequency depending characteristic. Embodiments of the present invention can of course be used with any other standard or communication method with the modulation used at least dependent on frequency. Embodiments of the present invention are just applicable to wireless cellular communication systems but can be used in any arrangement where signals are transferred using a modulated radio or the like signal.

The invention claimed is:

1. An apparatus, comprising:
   a first estimator configured to estimate non-reference information to provide estimated information, said non-reference information comprising n symbols at least one of immediately preceding and immediately succeeding reference information that is known to said apparatus and is comprised in a signal received at the apparatus;
   an error estimator configured to use the estimated information to determine an error in said signal received;
   a frequency error corrector configured to compensate for said error; and
   a second estimator configured to estimate m symbols of said non-reference information to provide estimated information, wherein said second estimator is operatively connected to receive the error in said received signals from said error estimator;
   wherein m is greater than n.

2. The apparatus as claimed in claim 1, wherein said reference information comprises a training sequence.

3. The apparatus as claimed in claim 1, wherein said reference information is provided in a middle region of the signal.

4. The apparatus as claimed in claim 1, wherein said first estimator comprises an equaliser.

5. The apparatus as claimed in claim 1, wherein said first estimator is configured to carry out one of a reduced state sequence estimation method and a decision feedback estimation method.

6. The apparatus as claimed in claim 1, wherein said error comprises a frequency error.

7. The apparatus as claimed in claim 1, wherein the error estimator comprises a frequency estimator.

8. The apparatus as claimed in claim 7, wherein said frequency estimator uses a linear minimum means square error method to estimate a frequency.

9. The apparatus as claimed in claim 1, wherein said error estimator is configured to provide a frequency offset correction to at least some of the received signal.

10. The apparatus as claimed in claim 1, further comprising:
    a second error estimator configured to use said estimated m symbols from said second estimator.

11. The apparatus as claimed in claim 10, wherein said second error estimator is configured to estimate a frequency offset using said received signal.

12. The apparatus as claimed in claim 10, wherein said second error estimator comprises a frequency offset corrector configured to correct a frequency of the received signal.

13. An apparatus as claimed in claim 1, wherein the error estimator is configured to use the reference information to determine the error in said signal received.

14. An apparatus, comprising:
    estimating means for estimating non-reference information to provide estimated information, said non-reference information comprising n symbols at least one of immediately preceding and immediately succeeding reference information that is known to said apparatus and is comprised in a signal received at the apparatus;
    error estimating means for using the estimated information to determine a frequency error in said signal received;
    frequency error correcting means for compensating for said error; and
    second estimating means configured to estimate m symbols of said non-reference information to provide estimated information, wherein said second estimating means is operatively connected to receive the error in said received signals from said error estimating means;
    wherein m is greater than n.

15. A method, comprising:
    estimating by an estimator non-reference information to provide estimated information, said non-reference information comprising n symbols at least one of immediately preceding and immediately succeeding reference information that is known to an apparatus and is comprised in a signal received at the apparatus;
    using the estimated information by an error estimator to determine an error in said signal received;
    compensating by a frequency error corrector for said error; and
    estimating by a second estimator m symbols of said non-reference information to provide estimated information, wherein said second estimator is operatively connected to receive the error in said received signals from said error estimator;
    wherein m is greater than n.

16. The method as claimed in claim 15, further comprising: estimating a frequency offset using said received signal.

17. The method as claimed in claim 15, further comprising: correcting a frequency of the received signal.

18. The method as claimed in claim 15, comprising using the reference information by the error estimator to determine the error in said signal received.

19. An apparatus, comprising:
    a first stage comprising a first estimator configured to estimate a first number of symbols of a received signal, a first error estimator configured to estimate a frequency error based on the estimated first number of symbols, and a first frequency error corrector configured to carry out a first frequency offset correction on a second number of symbols of the received signal to provide a modified signal; and a second stage comprising a second estimator configured to estimate at least the second number of symbols of the modified signal, a second error estimator configured to estimate a frequency error based on the estimated second number of symbols estimated by said second estimator, and a second frequency error corrector configured to carry out a second frequency offset correction on the received signal using the frequency error estimated by said second error estimator;

wherein said first number is less than said second number.

20. An apparatus as claimed in claim 19, wherein one or both of said first estimator and said second estimator comprises an equaliser.

21. An apparatus as claimed in claim 19, wherein one or both of said first error estimator and said second error estimator is configured to use a linear minimum means square error method.

22. A method, comprising:
a first stage comprising:
estimating, by a first estimator a first number of symbols of a received signal,
estimating, by the first error estimator, a frequency error based on the estimated first number of symbols, and
carrying out, by the first frequency error corrector, a first frequency offset correction on a second number of symbols of the received signal to provide a modified signal; and
a second stage comprising:
estimating, by a second estimator, at least the second number of symbols of the modified signal,
estimating, by the second error estimator, a frequency error based on the estimated second number of symbols, and
carrying out, by the second frequency error corrector, a second frequency offset correction on the received signal using the frequency error that is based on the estimated second number of symbols;
wherein said first number is less than said second number.

* * * * *